(12) United States Patent
Posser et al.

(10) Patent No.: US 12,505,277 B1
(45) Date of Patent: Dec. 23, 2025

(54) CELL-BASED PIN ACCESS LOCATION GENERATION

(71) Applicant: Cadence Design Systems, Inc., San Jose, CA (US)

(72) Inventors: Gracieli Posser, Austin, TX (US); Mateus Paiva Fogaça, Porto Alegre (BR); Wing-Kai Chow, Austin, TX (US); Mehmet Can Yildiz, Austin, TX (US); Charles Jay Alpert, Cedar Park, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 597 days.

(21) Appl. No.: 17/982,269

(22) Filed: Nov. 7, 2022

(51) Int. Cl.
*G06F 30/398* (2020.01)
*G06F 30/31* (2020.01)

(52) U.S. Cl.
CPC ............ *G06F 30/398* (2020.01); *G06F 30/31* (2020.01)

(58) Field of Classification Search
CPC .................................................... G06F 30/398
USPC ........................................................ 716/112
See application file for complete search history.

(56) References Cited

PUBLICATIONS

Kahng, Andrew B.; Wang, Lutong;, Xu, Bangqi; "The Tao of PAO: Anatomy of a Pin Access Oracle for Detailed Routing," 2020, IEEE (Year: 2020).*

Kahng, Andrew B., et al., "The Tao of PAO: Anatomy of a Pin Access Oracle for Detailed Routing", Downloaded on Feb. 28, 2022 at 19:52:46 UTC from IEEE Xplore, (2020), 6 pgs.

* cited by examiner

*Primary Examiner* — Eric D Lee
(74) *Attorney, Agent, or Firm* — Schwegman Lundberg & Woessner, P.A.

(57) ABSTRACT

Various embodiments provide for pin access location generation for one or more cells of a circuit design, which may be part of electronic design automation (EDA). Some embodiments facilitate pin access location generation by generating and using multiple graphs, which enable such embodiments to ensure that neighbor pins are not missed and to check for design rule violations.

20 Claims, 10 Drawing Sheets

CELL-BASED PIN ACCESS LOCATION GENERATION

TECHNICAL FIELD

Embodiments described herein relate to circuit design and, more particularly, to systems, methods, devices, and instructions for cell-based pin access location generation for a circuit design, which may be part of electronic design automation (EDA).

BACKGROUND

In electronic design automation (EDA) software systems, it is common to use standard cells in the design of a circuit design. A standard cell usually comprises one or more pins, where each pin can be composed of complex shapes (e.g., rectangles or polygons). During net routing of a circuit design that includes a standard cell, an access point is identified with respect to one or more pins of the standard cell. Access points (hereafter, pin access points) are usually identified in view of design rules (e.g., design rule constraints (DRCs)) to prevent design violations (e.g., DRC violations). However, finding optimal locations for pin access points can be critical for circuit designs, especially for designs that use newer technology nodes, as pin access point locations can affect placement and routing of a circuit design.

BRIEF DESCRIPTION OF THE DRAWINGS

Various ones of the appended drawings merely illustrate various embodiments of the present disclosure and should not be considered as limiting its scope.

DETAILED DESCRIPTION

Figure 1:
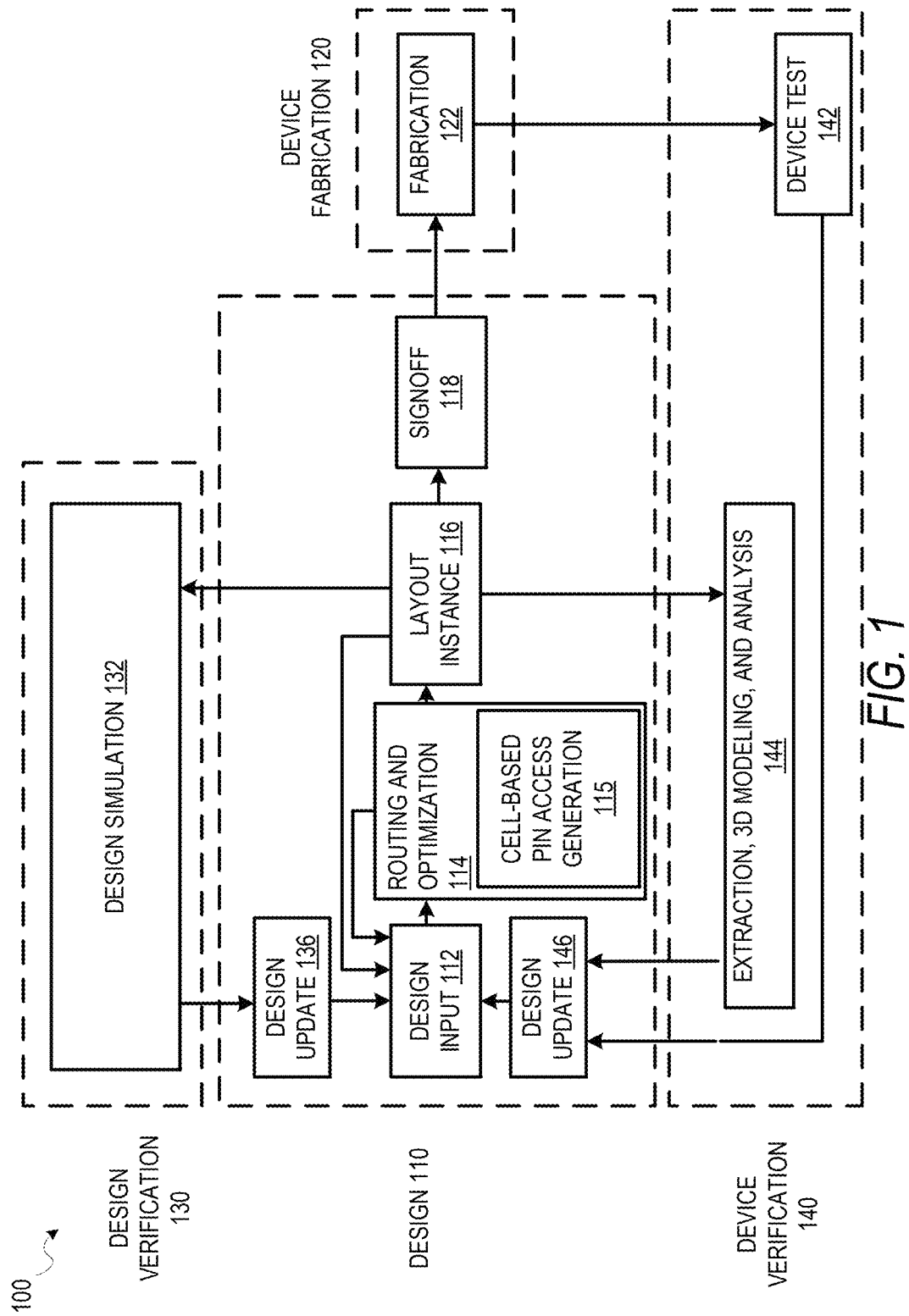
FIG. 1 is a diagram illustrating an example design process flow for cell-based pin access location generation in a circuit design, according to some embodiments.

Various embodiments described herein provide for pin access location generation for one or more cells (e.g., standard cells) of a circuit design, which may be part of electronic design automation (EDA). As used herein, a pin access point can comprise a point where a track on a pin layer of a circuit design intersects with a track on an upper layer of the circuit design. An individual pin access point can serve as an actual location for accessing a pin (hereafter, referred to as a pin access location).

Some embodiments facilitate pin access location generation described herein by generating and using multiple graphs, which enable such embodiments to ensure that neighbor pins are not missed and to check for design rule violations (e.g., DRC violations). As a result, such embodiment can avoid design rule violations. In particular, the multiple graphs are used by some embodiments to determine (e.g., identify) pin access locations and, according to some embodiments, the overall process is an iterative flow that ensures that all pin access locations are free of design violations.

According to some embodiments, the pin access location generation process starts by traversing through one or more cells (e.g., all cells) in a cell library, such as a standard cell library. For a current cell being traversed, all possible on-track locations for pin access can be determined for each pin in the current cell. Based on one or more design rules, a conflict graph can be generated that specifies neighboring pin access locations that, if chosen, would cause violations. To build the conflict graph, pins can be sorted using one or more criteria to define a neighborhood. A dynamic programming-based procedure can use the conflict graph to select a pin access point for every pin in order to minimize the number of violations. The one or more selected pin access points can represent a solution for the current cell, where those one or more selected pin access points can serve as pin access locations for the current cell. A violation checker can be run to determine (e.g., check whether) a solution is design rule violation free. If there is at least one violation, another conflict graph is generated using one or more different sorting criteria for those pins with violations, and the dynamic programming-based procedure can be run again. The overall process can terminate when a violation-free solution (e.g., comprising one or more pin access points selected as pin access locations) is found, after a number (e.g., N) iterations are performed, or after a number (e.g., N) iterations are performed with no additional reduction (decrease) in a number of design rule violations between iterations. Eventually, if no violation-free solution is found, a solution with a minimum number of violations can be returned.

Alternatively, some embodiments can use a netlist instead of a cell library, traverse through every instance of the netlist, and add extra costs to every pin access location so that pin access locations closer to a net source is preferred. In doing so, some embodiments can facilitate better pin alignment and total net wirelength.

For some embodiments, a standard cell-based pin access location generation tool is provided that is placement independent, that considers intra-cell blockages, or both. Such a tool can reduce or minimize DRC violations and better approximate actual routing (e.g., approximate actual pin locations). Additionally, such a tool can be used in an initial of design flow of a circuit design, thereby enabling subsequent steps in the design flow to take advantage of more accurate pin locations.

Pin access location generation described herein can provide realistic or accurate locations for accessing pins early during a circuit design flow, such as prior to performing the placement phase of the circuit design flow. In doing so, placement optimization can know pin access locations beforehand and use the pin access locations, for example, for pin alignments when placing cells. Additionally, knowing the pin access locations early in a circuit design flow can improve timing estimation of a circuit design (e.g., make timing estimations more accurate).

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a diagram illustrating an example design process flow 100 for cell-based pin access location generation for a circuit design, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in a routing and optimization 114 operation, along with any other automated design processes. The routing and optimization 114 operation may also include other operations not shown, such as those relating to floorplanning, placement, post-placement optimization, and post-routing optimization. As shown, the routing and optimization 114 operation includes a cell-based pin access generation 115 operation, which may be performed in accordance with various embodiments described herein. For instance, the cell-based pin access generation 115 operation can generate a set of pin access location with respect to a cell of a circuit design using an iterative process described herein.

While the design process flow 100 shows optimization occurring prior to a layout instance 116, timing analysis, and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

Design inputs are used in the design input 112 operation to generate an initial circuit layout. The design inputs may be further processed during the design input 112 operation via a process, such as logic-synthesis, to generate a circuit netlist mapped to a target standard library manufacturable by the foundry in fabrication 122 operation. After design inputs are used in the design input 112 operation to generate an initial circuit layout, and any of the routing and optimization 114 operations are performed, a resulting layout is generated as the layout instance 116. The netlist as placed by the layout instance 116 describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations, and layout modifications generated based on actual device performance.

As described in more detail below, a design update 136 from the design simulation 132; a design update 146 from the device test 142 or the extraction, 3D modeling, and analysis 144 operations; or the design input 112 operation may occur after the initial layout instance 116 is generated. In various embodiments, whenever design inputs are used to update or change an aspect of a circuit design, a timing analysis and the routing and optimization 114 operation may be performed.

Figure 2:
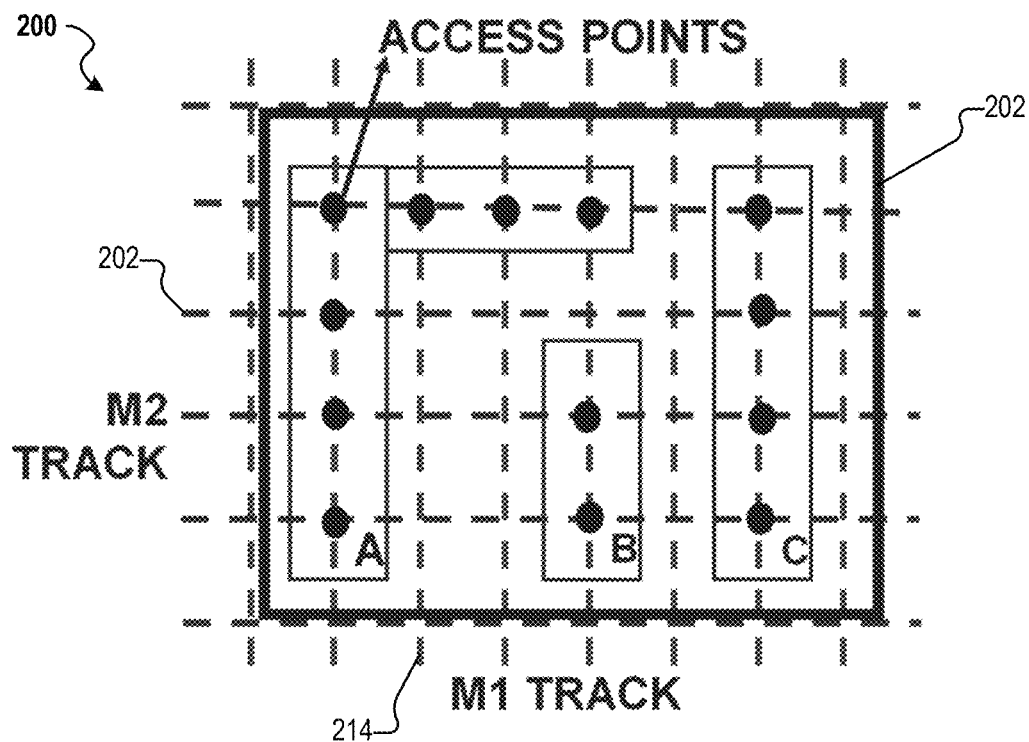
FIG. 2 is a diagram illustrating an example cell upon which pin access generation can be performed, according to some embodiments.

FIG. 2 is a diagram illustrating an example cell 200 upon which pin access generation can be performed, according to some embodiments. In FIG. 2, the cell 200 comprises pins A, B and C, each pin having pin access points where a track (e.g., one of vertical tracks 214) of metal layer one (M1) intersects with a track (e.g., one of horizontal tracks 202) of metal layer two (M2) within the boundaries of the pin. Depending on the embodiment, one or more of pins A, B, and C can be disposed on M1 or M2. For instance, each of pins A, B, and C can be disposed on M1 and M2 would be an upper layer from where the pins can be accessed. For some embodiments, a pin access point of a given pin would be located half a width inside the given pin.

FIGS. 3 through 6 are flowcharts illustrating example methods for cell-based pin access generation, according to some embodiments. It will be understood that example methods described herein may be performed by a device, such as a computing device executing instructions of an EDA software system, in accordance with some embodiments. Additionally, example methods described herein may be implemented in the form of executable instructions stored on a computer-readable medium or in the form of electronic circuitry. For instance, the operations of a method 300 of FIG. 3 may be represented by executable instructions that, when executed by a processor of a computing device, cause the computing device to perform the method 300. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Figure 3:
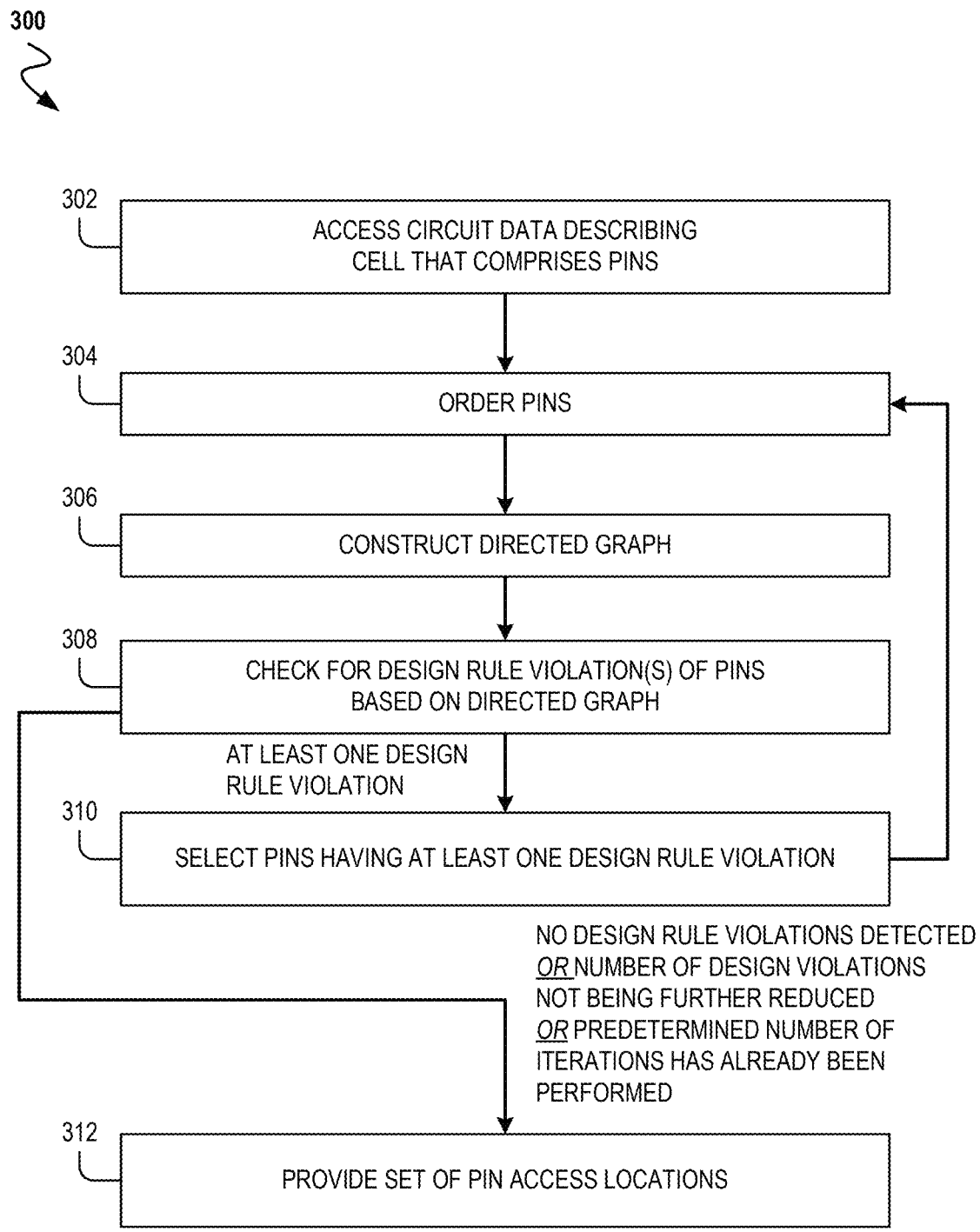
FIGS. 3 through 6 are flowcharts illustrating example methods for cell-based pin access generation, according to some embodiments.

Referring now to FIG. 3, the flowchart illustrates the example method 300 for cell-based pin access generation for a cell of a circuit design, according to some embodiments. The method 300 can be performed with respect to each cell in a cell library associated with a circuit design. For some embodiments, the method 300 is performed prior a to placement stage of design flow being performed on a circuit design (e.g., by an EDA software system). An operation of the method 300 (or another method described herein) may be performed by a hardware processor (e.g., central processing unit or graphics processing unit) of a computing device (e.g., desktop, server, etc.).

As illustrated, operation 302 accessing circuit data that describes a cell for a circuit design, where the cell comprises a set of pins (e.g., pins A, B, C of the cell 200). Additionally, operation 302 can access track grids of the circuit design, which can be described by circuit design data, and can access one or more design rules, which can be described by technology data (e.g., a technology file). At operation 304, the set of pins is ordered according to at least one sorting criterion. For example, the set of pins can be ordered in ascending order (or descending order) according to a center of gravity of each pin's shapes, either on a horizontal axis (e.g., x axis) or a vertical axis (e.g., y axis). For instance, an embodiment can order the set of pins in ascending order according to a center of gravity of each pin's shapes on a horizontal axis (e.g., x axis), and if two or more pins have the same horizontal coordinate, the two or more pins can be ordered in ascending order according to a center of gravity of each pin's shapes on the vertical axis (e.g., y axis).

During operation 306, a directed graph is constructed from pin access points of the ordered set of pins based on the order of the ordered set of pins, where nodes of the directed graph correspond to the pin access points of the ordered set of pins.

At operation 308, the ordered set of pins are checked for one or more design rule violations based on the directed graph. For instance, operation 308 can determine a least cost (or least penalty) path in the directed graph from a node associated with a pin access point of a first pin in the order set of pins, to a node associated with a pin access points of a last pin in the ordered set of pins. The least cost path can be determined, for example, using dynamic programming. Operation 308 can check pin access points that correspond to the nodes of the least cost path for one or more design rule violations.

In response to at least one design rule violation being detected, the method 300 can proceed to operation 310, where pins of the ordered set of pins that have at least one pin access point (in the least cost path) with at least one design rule violation are selected (e.g., determined). Additionally, the pin access points of the least cost path that do not have a design rule violation can be added as part of a set of pin access locations (e.g., solution) being generated by the method 300. After operation 310, the method 300 can return to operation 304, where the pins selected by operation 310 can serve as the new set of pins to be operated on by operations 304, 306, 308. In this way, the method 300 can perform another iteration for identifying additional pin access points that are free of design rule violations and can be added to the set of pin access locations generated by the method 300.

From operation 308, the method 300 can proceed to operation 312 in response to one or more criteria being satisfied, including for example: no design rule violations being detected during operation 308; number of design violation are not being reduced by additional iterations (e.g., after N number of iterations) of operations 304 through 310; or a predetermined (e.g., predefined) number of iterations of operations 304 through 310 have already been performed. At operation 312, the set of pin access locations is provided as a result of the method 300. Where the method 300 proceeds from operation 308 to operation 312 in response to the number of violations not being further reduced, the set of pin access locations can represent the set of pin access locations with the least amount of design rule violations.

Figure 4:
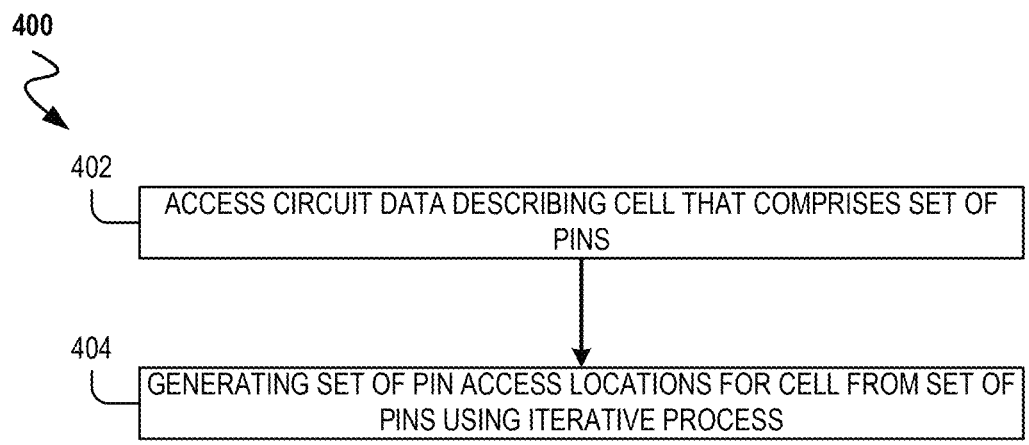

Referring now to FIG. 4, the flowchart illustrates the example method 400 for cell-based pin access generation for a cell of a circuit design, according to some embodiments. In particular, the method 400 can represents a specific implementation of method 300 of FIG. 3. The method 400 can be performed with respect to each cell in a cell library associated with a circuit design. Like the method 300 of FIG. 3, the method 400 can be performed by a hardware processor.

At operation 402, circuit data describing a cell for a circuit design is accessed, where the cell comprises a set of pins (e.g., pins A, B, C of the cell 200). Subsequently, operation 404 generates a set of pin access locations for the cell from the set of pins of the cell. The method 500 of FIG. 5 can represent an example implementation for performing operation 404.

Figure 5:
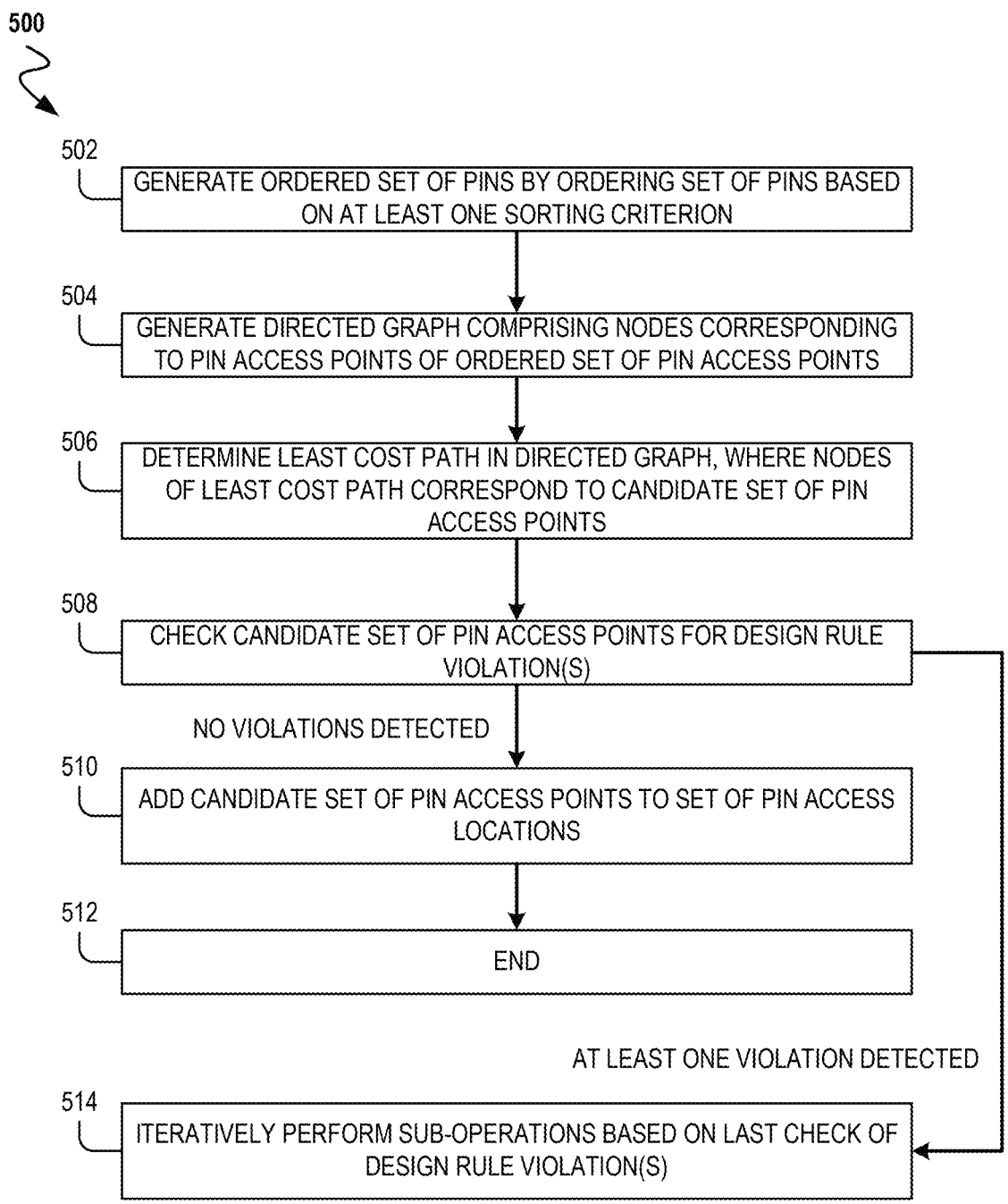

Referring now to FIG. 5, at operation 502, an ordered set of pins is generated by ordering the set of pins based on at least one sorting criterion. For some embodiments, operation 502 comprises sorting an individual pin of the set of pins according to an ascending order based on centers of gravity of the individual pins on a horizontal axis or, alternatively, on a vertical axis.

Then, operation 504 generates a directed graph that comprises nodes corresponding to pin access points of the ordered set of pins. For some embodiments, operation 504 comprises traversing through the ordered set of pins in order and, for each traversed pin, connecting each pin access point of the traversed pin to all pin access points of a next pin to be traversed in the ordered set of pins.

Thereafter, during operation 506 a least cost path is determined, in the directed graph, from a start node of the directed graph to an end pin node of the directed graph. For various embodiments, the start node of the directed graph corresponds to one pin access point of a first pin in the ordered set of pins, and the end node corresponds to one pin access point of a last pin in the ordered set of pins. According to various embodiments, the nodes of (e.g., that make up) the least cost path correspond to a candidate set of pin access points for the cell.

For some embodiments, operation 506 comprises using dynamic programming to determine the least cost path from the start pin node of the directed graph to the end node of the directed graph. Further, the least cost path can be determined based on one or more costs. For example, the least cost path from the start node of the directed graph to the end node of the directed graph can be determined based on one or more node costs, one or more edge costs, or one or more other costs. The one or more node costs of a select node of the directed graph can comprise a Manhattan distance between a center of the cell and a pin access point corresponding to the select node. The one or more node costs of a select node of the directed graph can comprise a cost of a layer (e.g., layer penalty) of a select pin that includes a pin access point corresponding to the select node (e.g., where lower layers have higher cost). For instance, the cost of the layer can be calculated by the following Formula 1: 1000*(maxRouteLayer−currentPinShapeLayer). The one or more edge costs of an edge of the directed graph between two nodes can comprise a cost of causing a design rule violation between two pins that are associated with two pin access points corresponding to the two nodes. For instance, the cost of causing the design rule violation can comprise a large penalty value, such as a value of 10000. The one or more edge costs of an edge of the directed graph between two nodes can comprise a (same track) penalty in response to two pin access points corresponding to the two nodes being on a same track. For instance, the same track penalty can comprise a penalty value, such as a value of 1000. For some embodiments, the one or more node costs and the one or more edge costs can be combined into a single penalty cost, such as the following Formula 2:

$$P_{n0,n1} = D_{n0} + L_{n0} + DRC_{n0,n1} + T_{n0,n1} + D_{n1} + L_{n1},$$

where $P(n0, n1)$ is the penalty between node n0 and node n1, $D_{ni}$ is the Manhattan distance of i to the center of the cell, $L_{ni}$ is the layer penalty of i, $DRC(n0,n1)$ is the penalty of causing a DRC violation between node n0 and node n1, and $T(n0,n1)$ is the penalty of putting node n0 and node n1 on the same track. For various embodiments, one or more penalty costs used for node costs, edge costs, or both can be user-defined and can be determined (or adjusted) based on testing (e.g., trying different penalty values).

At operation 508, the candidate set of pin access points (associated with the least cost path) is checked for one or more design rule violations. In response to no design rule violation being detected by operation 508, the method 500 proceeds from operation 508 to operation 510. At operation 510, the candidate set of pin access points is added to the set of pin access locations and, at operation 512, the method 500 ends (e.g., with no additional iterations being performed).

Alternatively, in response to at least one design rule violation being detected by operation 508, the method 500 proceeds from operation 508 to operation 514. Operation 514 iteratively performs sub-operations based on a last check of design rule violations. The method 600 of FIG. 6 can represent an example implementation for performing operation 514.

Figure 6:
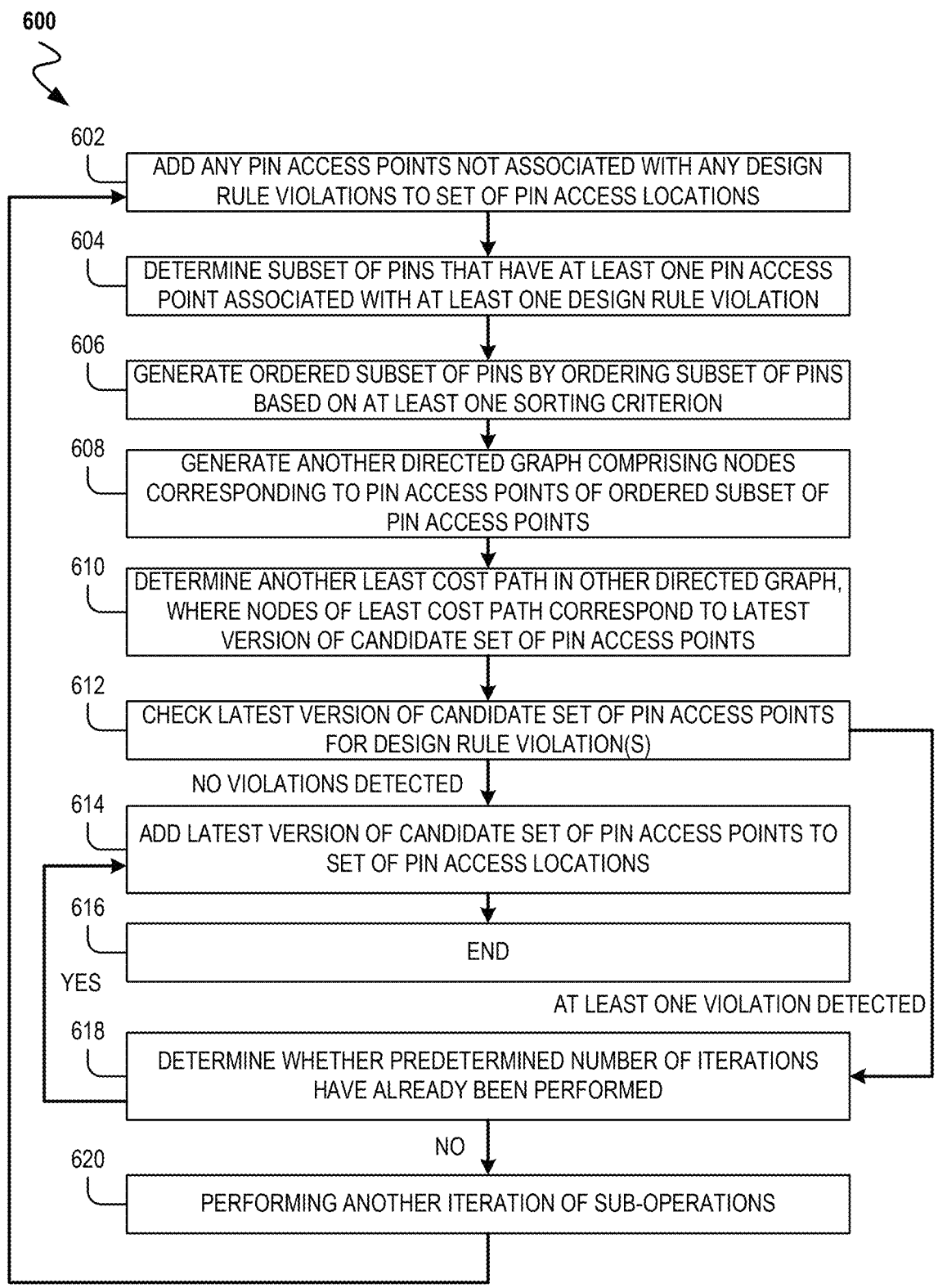

Referring now to FIG. 6, operation 602 adds, to the set of pin access locations, any pin access points from a latest version of the candidate set of pin access points that are not associated with any design rule violations detected by a last check of one or more design rule violations. Additionally, operation 604 determines a subset of pins from the set of pins that have at least one pin access point, in the latest version of the candidate set of pin access points, that is associated with at least one design rule violation detected by the last check of one or more design rule violations.

At operation 606, an ordered subset of pins is generated by ordering the subset of pins based on the at least one sorting criterion. Thereafter, operation 608 generates another (e.g., second) directed graph that comprises nodes corresponding to pin access points of the ordered subset of pins. For some embodiments, operation 608 comprises traversing through the ordered subset of pins in order and, for each traversed pin, connecting each pin access point of the traversed pin to all pin access points of a next pin to be traversed in the ordered subset of pins.

During operation 610, another least cost path in the other directed graph is determined from a start node of the other directed graph to an end node of the other directed graph. For various embodiments, the start node of the other directed graph corresponds to one pin access point of a first pin in the ordered subset of pins, and the end node corresponds to one pin access point of a last pin in the ordered subset of pins. According to various embodiments, the nodes of (e.g., that make up) the other least cost path of the other directed graph correspond to the latest version of the candidate set of pin access points for the cell. For operation 612, the latest version of the candidate set of pin access is checked for one or more design rule violations.

In response to no design rule violations being detected by the checking of the latest version of the candidate set of pin access points (at operation 612), the method 600 proceeds from operation 612 to 614. At operation 614, the latest version of the candidate set of pin access points is added to the set of pin access locations (e.g., the solution provided by the method 500 of FIG. 5) and, at operation 616, the method 600 ends (e.g., without further iterations of the sub-operations).

In response to at least one design rule violation being detected by the checking of the pin access points of the second least cost path (at operation 612), the method 600 proceeds from operation 612 to 618. Operation 618 determines whether a predetermined number of iterations have already been performed. If yes (a predetermined number of iterations have already been performed), the method 600 proceeds from operation 618 to 614 and no further iterations are performed. However, if no (a predetermined number of iterations have not already been performed), the method 600 proceeds from operation 618 to 620. Operation 620 causes another iteration of sub-operations to be performed by returning to operation 602.

Figure 7:
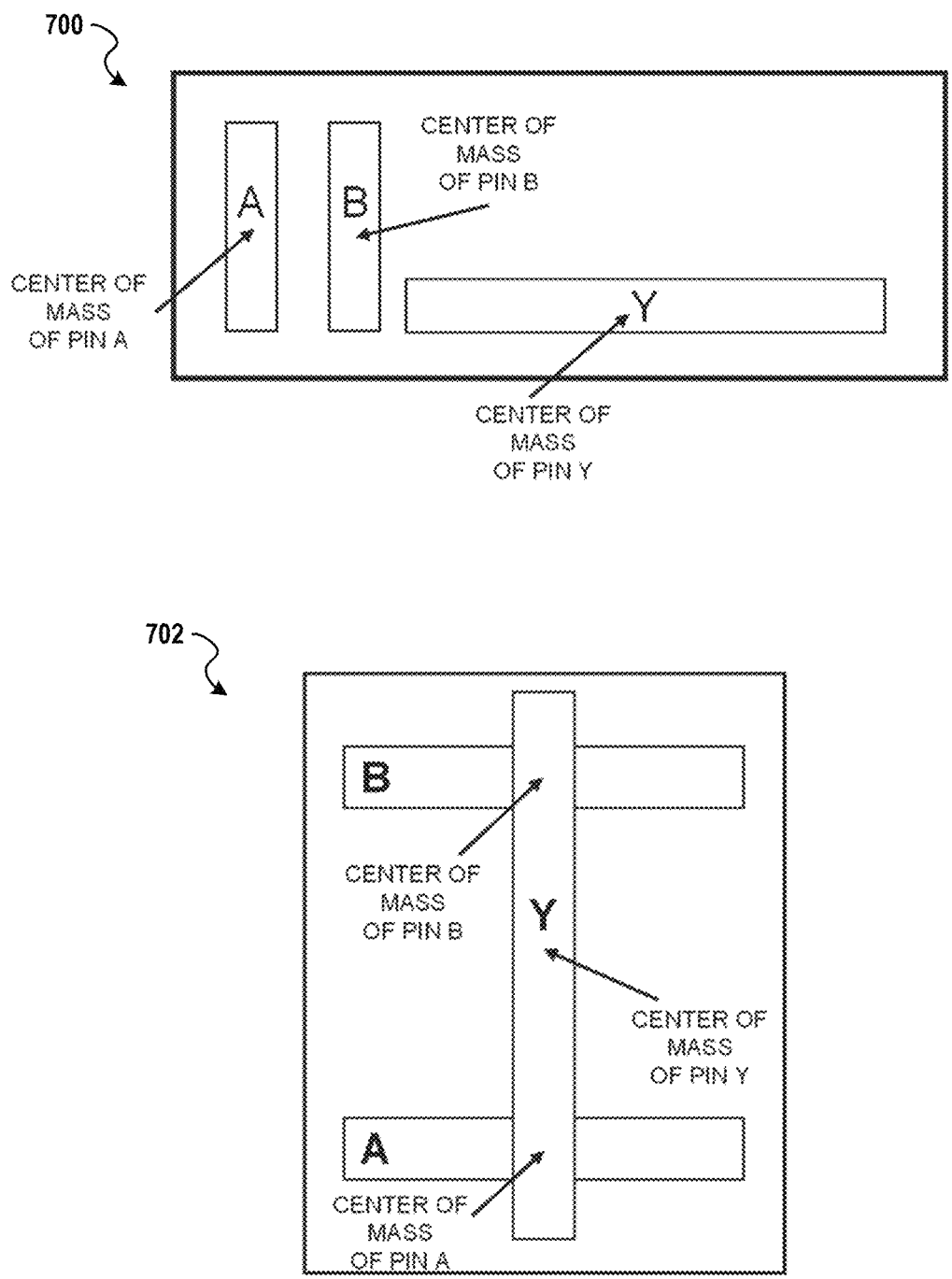
FIG. 7 is a diagram illustrating examples of ordering pins of cells, according to some embodiments.

FIG. 7 is a diagram illustrating examples of ordering pins of cells, according to some embodiments. In particular, FIG. 7 illustrates example cells 700, 702 where each comprises a pin A, B, Y. As shown, each pin has an identified center of gravity of each pin's shape, which can be used in ordering the pin cells for each of the cells 700, 702. For instance, according to some embodiments, pins A, B, Y of the cell 700 can be ordered in ascending order (e.g., left to right) according to a center of gravity of each pin's shapes on the horizontal axis (e.g., x axis), thereby ordering the pins as A, B, and Y. In comparison, pins A, B, Y of the cell 700 can be ordered in descending order (e.g., right to left) according to a center of gravity of each pin's shapes on the horizontal axis (e.g., x axis), thereby ordering the pins as Y, B, and A. Additionally, the cell 702 can illustrate a situation where multiple pins (A, B, and Y) each have a center of gravity at the same x coordinate. In such an instance, pins A, B, Y of the cell 702 can be ordered in ascending order (e.g., top to bottom) according to a center of gravity of each pin's shapes on the vertical axis (e.g., y axis), thereby ordering the pins as A, Y, and B.

Figure 8:
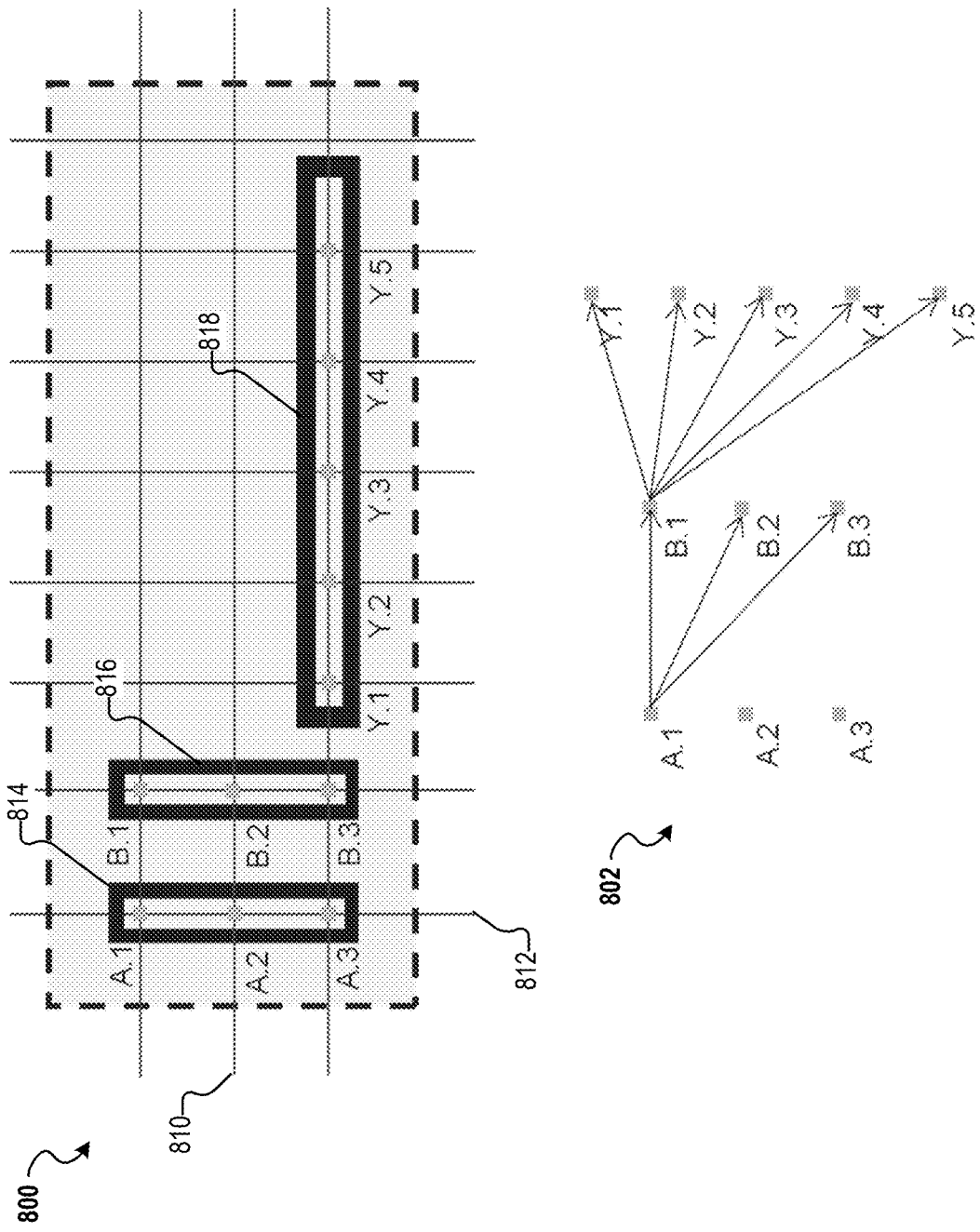
FIG. 8 is a diagram illustrating an example of constructing a directed graph for a cell, according to some embodiments.

FIG. 8 is a diagram illustrating an example of constructing a directed graph 802 for a cell 800, according to some embodiments. In FIG. 8, the cell 800 comprises pin A (814), pin B (816), and pin Y (818). As shown, each pin A, B, Y comprises pin access points where tracks 810, 812 intersect within the boundaries of shapes of pins. According, pin A comprises pin access points A.1, A.2, and A.3, pin B comprises pin access points B.1, B.2, and B.3, and pin Y comprises pin access points Y.1, Y.2, Y.3, Y.4, and Y.5. Additionally, for some embodiments, the cell 800 is similar to the cell 700 of FIG. 7 and, as such, the pins A, B, and Y of the cell 800 can be ordered in ascending order according to a center of gravity of each pin's shapes on the horizontal axis (e.g., x axis) to be pins A, B, and Y.

According to various embodiments, the ordered set of pins of the cell 800 are traversed according to its order and the directed graph 802 is constructed based on this order. For example, based on the ordering of the pins, some embodiments generate the directed graph 802 such that pin access points of pins A, B, Y can serve as (e.g., correspond to) nodes of the directed graph 802. The edges of the directed graph 802 can be generated such that all pin access points of one pin (e.g., pin A) can be connected (with an edge) to their neighbor (e.g., pin B) in the ordered set of pins. Accordingly, the node corresponding to pin access point A.1 can be connected (with an edge) to nodes corresponding pin access points B.1, B.2, and B.3. The node corresponding to pin access point A.2 can be connected (with an edge) to nodes corresponding pin access points B.1, B.2, and B.3. Additionally, the node corresponding to pin access point A.3 can be connected (with an edge) to nodes corresponding pin access points B.1, B.2, and B.3. Likewise, all pin access points of pin B can be connected (with an edge) to their neighbor (pin Y) in the ordered set of pins. Accordingly, the node corresponding to pin access point B.1 can be connected (with an edge) to nodes corresponding pin access points Y.1, Y.2, Y.3, Y.4, and Y.5. The node corresponding to pin access point B.2 can be connected (with an edge) to nodes corresponding pin access points Y.1, Y.2, Y.3, Y.4, and Y.5. The node corresponding to pin access point B.3 can be connected (with an edge) to nodes corresponding pin access points Y.1, Y.2, Y.3, Y.4, and Y.5.

Figure 9:
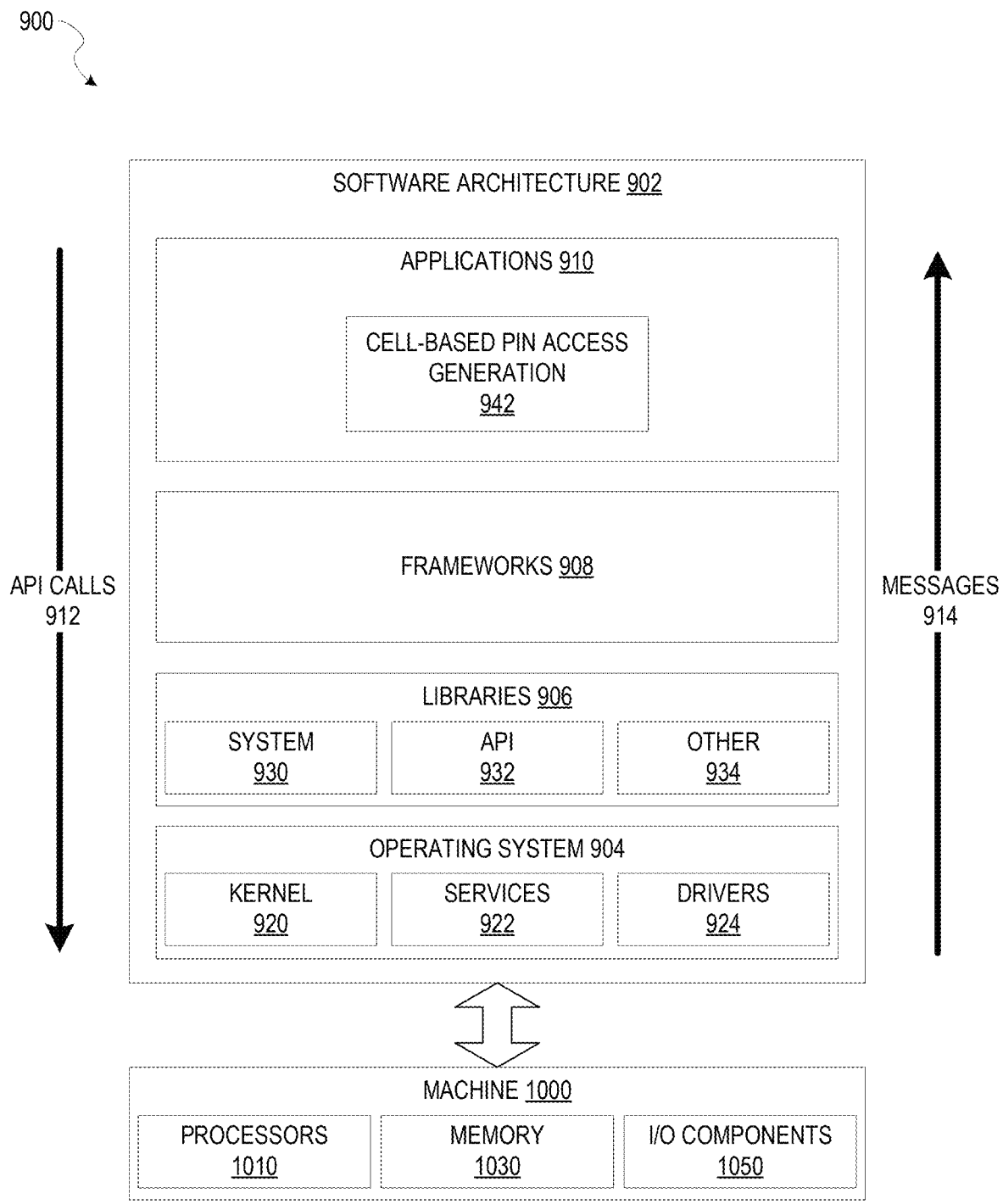
FIG. 9 is a block diagram illustrating an example of a software architecture that may be operating on an electronic design automation (EDA) computing device and may be used with methods for pin access location generation for one or more cells of a circuit design, according to some embodiments.

FIG. 9 is a block diagram 900 illustrating an example of a software architecture 902 that may be operating on an EDA computer and may be used with methods for pin access location generation for one or more cells of a circuit design, according to some embodiments. The software architecture 902 can be used as an EDA computing device to implement any of the methods described above. Aspects of the software architecture 902 may, in various embodiments, be used to store circuit designs, and to facilitate generation of a circuit design in an EDA environment by generating pin access locations for one or more cells of the circuit design.

FIG. 9 is merely a non-limiting example of a software architecture 902, and it will be appreciated that many other architectures can be implemented to facilitate the functionality described herein. In various embodiments, the software architecture 902 is implemented by hardware such as a machine 1000 of FIG. 10 that includes processors 1010, memory 1030, and I/O components 1050. In this example, the software architecture 902 can be conceptualized as a stack of layers where each layer may provide a particular functionality. For example, the software architecture 902 includes layers such as an operating system 904, libraries 906, software frameworks 908, and applications 910. Operationally, the applications 910 invoke application programming interface (API) calls 912 through the software stack and receive messages 914 in response to the API calls 912, consistent with some embodiments. In various embodiments, any client device, any server computer of a server system, or any other device described herein may operate using elements of the software architecture 902. An EDA computing device described herein may additionally be implemented using aspects of the software architecture 902, with the software architecture 902 adapted for operating to perform pin access location generation for one or more cells in any manner described herein.

In some embodiments, an EDA application of the applications 910 performs pin access location generation for one or more cells according to embodiments described herein using various modules within the software architecture 902. For example, in some embodiments, an EDA computing device similar to the machine 1000 includes the memory 1030 and the one or more processors 1010. The processors 1010 also implement a cell-based pin access generation module 942 for pin access location generation for one or more cells of a circuit design in accordance with various embodiments described herein.

In various other embodiments, rather than being implemented as modules of the one or more applications 910, the cell-based pin access generation module 942 may be implemented using elements of the libraries 906, the operating system 904, or the software frameworks 908.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, signal-processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 such as libraries of blocks for use in an EDA environment or other libraries that can provide functions such as memory allocation functions, string manipulation functions, mathematic functions, and the like. In addition, the libraries 906 can include API libraries 932 such as media libraries (e.g., libraries to support presentation and manipulation of various media formats such as Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 906 may also include other libraries 934.

The software frameworks 908 provide a high-level common infrastructure that can be utilized by the applications 910, according to some embodiments. For example, the software frameworks 908 provide various graphic user interface (GUI) functions, high-level resource management, high-level location services, and so forth. The software frameworks 908 can provide a broad spectrum of other APIs that can be utilized by the applications 910, some of which may be specific to a particular operating system 904 or platform. In various embodiments, the systems, methods, devices, and instructions described herein may use various files, macros, libraries, and other elements of an EDA design environment to implement pin access location generation for one or more cells as described herein. This includes analysis of input design files for an integrated circuit design, along with any element of hierarchical analysis that may be used as part of or along with the embodiments described herein. While netlist files, library files, SDC files, and view definition files are examples that may operate within the software architecture 902, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 1000 including processors 1010), with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine 1000, but deployed across a number of machines 1000. In some embodiments, the processors 1010 or processor-implemented modules are located in a single geographic location (e.g., within a home environment, an office environment, or a server farm). In some other embodiments, the processors or processor-implemented modules are distributed across a number of geographic locations.

Figure 10:
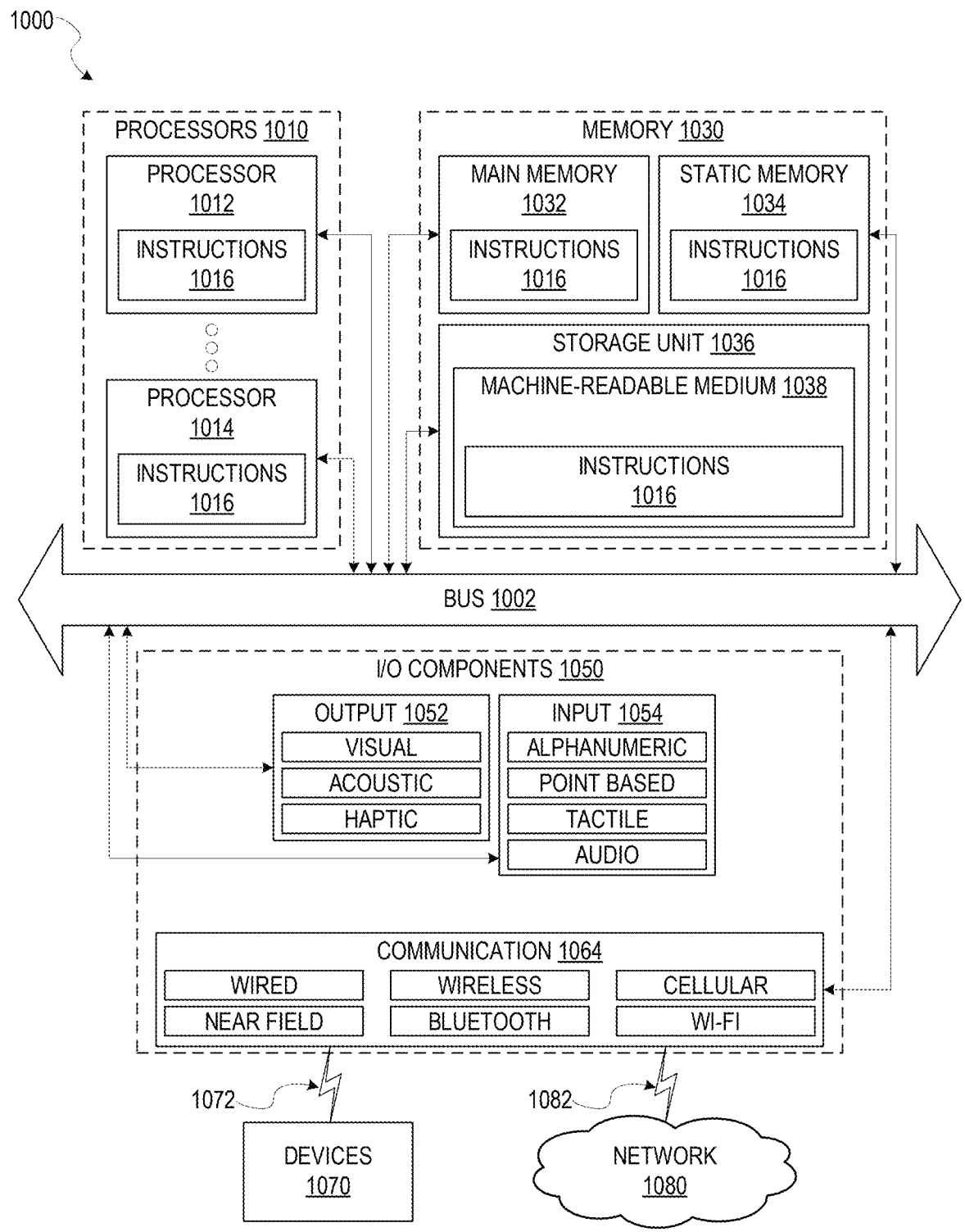
FIG. 10 is a diagram representing a machine in the form of a computer system within which a set of instructions are executed, causing the machine to perform any one or more of the methods discussed herein, according to some embodiments.

FIG. 10 is a diagrammatic representation of the machine 1000 in the form of a computer system within which a set of instructions may be executed for causing the machine 1000 to perform any one or more of the methodologies discussed herein, according to some embodiments. FIG. 10 shows components of the machine 1000, which is, according to some embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein can be executed. In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

In various embodiments, the machine 1000 comprises processors 1010, memory 1030, and I/O components 1050, which can be configured to communicate with each other via a bus 1002. In some embodiments, the processors 1010 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 1012 and a processor 1014 that may execute the instructions 1016. The term "processor" is intended to include multi-core processors 1010 that may comprise two or more independent processors 1012, 1014 (also referred to as "cores") that can execute the instructions 1016 contemporaneously. Although FIG. 10 shows multiple processors 1010, the machine 1000 may include a single processor 1012 with a single core, a single processor 1012 with multiple cores (e.g., a multi-core processor 1012), multiple processors 1010 with a single core, multiple processors 1010 with multiple cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium 1038 on which are stored the instructions 1016 embodying any one or more of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown, in some embodiments, to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., the instructions 1016) for execution by a machine (e.g., the machine 1000), such that the instructions, when executed by one or more processors of the machine (e.g., the processors 1010), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 can include many other components that are not shown in FIG. 10. The I/O components 1050 are grouped according to functionality merely for simplifying the following discussion, and the grouping is in no way limiting. In various embodiments, the I/O components 1050 include output components 1052 and input components 1054. The output components 1052 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point-based input components (e.g., a mouse, a touchpad, a trackball, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow, or outputs for circuit fabrication. As described herein, "constraints," "requirements," "design elements," and other aspects of a circuit design refer to selectable values that are set as part of the design of a circuit. Such design constraints, requirements, or elements may be adjusted by a system operator or circuit designer to suit the particular goals of a project or circuit that results from the operations described herein.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, the communication components 1064 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1070 may be another machine or any of a wide variety of peripheral devices (e.g., a peripheral device coupled via a USB).

In various embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling.

Furthermore, the machine-readable medium 1038 is non-transitory (in other words, not having any transitory signals) in that it does not embody a propagating signal. However, labeling the machine-readable medium 1038 "non-transitory" should not be construed to mean that the machine-readable medium 1038 is incapable of movement; the machine-readable medium 1038 should be considered as being transportable from one physical location to another. Additionally, since the machine-readable medium 1038 is tangible, the machine-readable medium 1038 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to some embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A system comprising:
a memory storing instructions; and
a hardware processor communicatively coupled to the memory and configured by the instructions to perform operations comprising:
accessing circuit data that describes a cell for a circuit design, the cell comprising a set of pins; and
generating a set of pin access locations for the cell from the set of pins, the generating of the set of pin access locations comprising:
generating an ordered set of pins by ordering the set of pins based on at least one sorting criterion, the ordering of the set of pins comprising sorting individual pins of the set of pins according to an ascending order based on centers of gravity of the individual pins on either a horizontal axis or a vertical axis;
generating a directed graph that comprises nodes corresponding to pin access points of the ordered set of pins, the generating the directed graph comprising traversing through the ordered set of pins in order and, for each traversed pin, connecting each pin access point of the traversed pin to all pin access points of a next pin to be traversed in the ordered set of pins;
determining a least cost path, in the directed graph, from a start node of the directed graph to an end pin node of the directed graph, the start node of the directed graph corresponding to one pin access point of a first pin in the ordered set of pins, the end node corresponding to one pin access point of a last pin in the ordered set of pins, nodes of the least cost path corresponding to a candidate set of pin access points for the cell;
checking the candidate set of pin access points for one or more design rule violations; and
in response to no design rule violations being detected by the checking of the candidate set of pin access points, adding the candidate set of pin access points to the set of pin access locations.

2. The system of claim 1, wherein the directed graph is a first directed graph, wherein the least cost path is a first least cost path, wherein the traversed pin is a first traversed pin, and wherein the generating of the set of pin access locations comprises:
in response to at least one design rule violation being detected by the checking of the candidate set of pin access points, iteratively performing sub-operations that comprise:
adding, to the set of pin access locations, any pin access points from a latest version of the candidate set of pin access points that are not associated with any design rule violations detected by a last check of one or more design rule violations;
determining a subset of pins from the set of pins that have at least one pin access point, in the latest version of the candidate set of pin access points, that is associated with at least one design rule violation detected by the last check of one or more design rule violations;
generating an ordered subset of pins by ordering the subset of pins based on the at least one sorting criterion;
generating a second directed graph that comprises nodes corresponding to pin access points of the ordered subset of pins, the generating the second directed graph comprising by traversing through the ordered subset of pins in order and, for each second traversed pin, connecting each pin access point of the second traversed pin to all pin access points of a next pin to be traversed in the ordered subset of pins;
determining a second least cost path, in the second directed graph, from a start node of the second directed graph to an end node of the second directed graph, the start node of the directed graph corresponding to one pin access point of a first pin in the ordered subset of pins, the end node of the directed graph corresponding to one pin access point of a last pin in the ordered subset of pins, nodes of the second least cost path corresponding to the latest version of the candidate set of pin access points for the cell;

checking the latest version of the candidate set of pin access for one or more design rule violations; and in response to no design rule violations being detected by the checking of the latest version of the candidate set of pin access points:

adding the latest version of the candidate set of pin access points to the set of pin access locations; and ending further iterations of the sub-operations.

3. The system of claim 2, wherein the sub-operations comprise:

in response to at least one design rule violation being detected by the checking of the pin access points of the second least cost path, performing another iteration of the sub-operations.

4. The system of claim 2, wherein the sub-operations comprise:

in response to at least one design rule violation being detected by the checking of the pin access points of the second least cost path, and after a predetermined number of iterations of the sub-operations:

adding the latest version of the candidate set of pin access points to the set of pin access locations; and ending further iterations of the sub-operations.

5. The system of claim 2, wherein the sub-operations comprise:

in response to at least one design rule violation being detected by the checking of the pin access points of the second least cost path, and after a predetermined number of iterations of the sub-operations with no decrease in design rule violation count between iterations and:

adding the latest version of the candidate set of pin access points to the set of pin access locations; and ending further iterations of the sub-operations.

6. The system of claim 1, wherein the determining of the least cost path, in the directed graph, from the start node of the directed graph to the end node of the directed graph comprises:

using dynamic programming to determine the least cost path from the start pin node of the directed graph to the end node of the directed graph.

7. The system of claim 1, wherein the determining of the least cost path, in the directed graph, from the start node of the directed graph to the end node of the directed graph is based on one or more node costs, the one or more node costs of a select node of the directed graph comprising a Manhattan distance between a center of the cell and a pin access point corresponding to the select node.

8. The system of claim 1, wherein the determining of the least cost path, in the directed graph, from the start node of the directed graph to the end node of the directed graph is based on one or more node costs, the one or more node costs of a select node of the directed graph comprising a cost of a layer of a select pin that includes a pin access point corresponding to the select node.

9. The system of claim 1, wherein the determining of the least cost path, in the directed graph, from the start node of the directed graph to the end node of the directed graph is based on one or more edge costs, the one or more edge costs of an edge of the directed graph between two nodes comprising a cost of causing a design rule violation between two pins that are associated with two pin access points corresponding to the two nodes.

10. The system of claim 1, wherein the determining of the least cost path, in the directed graph, from the start node of the directed graph to the end node of the directed graph is based on one or more edge costs, the one or more edge costs of an edge of the directed graph between two nodes comprising a penalty in response to two pin access points corresponding to the two nodes being on a same track.

11. The system of claim 1, wherein the operations are performed for each cell in a cell library associated with a circuit design.

12. A non-transitory computer-readable medium comprising instructions that, when executed by a hardware processor of a device, cause the device to perform operations comprising:

generating a set of pin access locations for a cell based on a set of pins of the cell, the generating of the set of pin access locations comprising:

generating an ordered set of pins by ordering the set of pins based on at least one sorting criterion, the ordering of the set of pins comprising sorting individual pins of the set of pins according to an ascending order based on centers of gravity of the individual pins on either a horizontal axis or a vertical axis;

generating a directed graph that comprises nodes corresponding to pin access points of the ordered set of pins, the generating the directed graph comprising traversing through the ordered set of pins in order and, for each traversed pin connecting each pin access point of the traversed pin to all pin access points of a next pin to be traversed in the ordered set of pins;

determining a least cost path, in the directed graph, from a start node of the directed graph to an end pin node of the directed graph, the start node of the directed graph corresponding to one pin access point of a first pin in the ordered set of pins, the end node corresponding to one pin access point of a last pin in the ordered set of pins, nodes of the least cost path corresponding to a candidate set of pin access points for the cell;

checking the candidate set of pin access points for one or more design rule violations; and in response to no design rule violations being detected by the checking of the candidate set of pin access points, adding the candidate set of pin access points to the set of pin access locations.

13. The non-transitory computer-readable medium of claim 12, wherein the directed graph is a first directed graph, wherein the least cost path is a first least cost path, wherein the traversed pin is a first traversed pin, and wherein the generating of the set of pin access locations comprises:

in response to at least one design rule violation being detected by the checking of the candidate set of pin access points, iteratively performing sub-operations that comprise:

adding, to the set of pin access locations, any pin access points from a latest version of the candidate set of pin access points that are not associated with any design rule violations detected by a last check of one or more design rule violations;

determining a subset of pins from the set of pins that have at least one pin access point, in the latest version of the candidate set of pin access points, that is associated with at least one design rule violation detected by the last check of one or more design rule violations;

generating an ordered subset of pins by ordering the subset of pins based on the at least one sorting criterion;

generating a second directed graph that comprises nodes corresponding to pin access points of the ordered subset of pins, the generating the second directed graph comprising by traversing through the ordered subset of pins in order and, for each second traversed pin, connecting each pin access point of the second traversed pin to all pin access points of a next pin to be traversed in the ordered subset of pins;

determining a second least cost path, in the second directed graph, from a start node of the second directed graph to an end node of the second directed graph, the start node of the directed graph corresponding to one pin access point of a first pin in the ordered subset of pins, the end node of the directed graph corresponding to one pin access point of a last pin in the ordered subset of pins, nodes of the second least cost path corresponding to the latest version of the candidate set of pin access points for the cell;

checking the latest version of the candidate set of pin access for one or more design rule violations; and in response to no design rule violations being detected by the checking of the latest version of the candidate set of pin access points:
adding the latest version of the candidate set of pin access points to the set of pin access locations; and
ending further iterations of the sub-operations.

14. The non-transitory computer-readable medium of claim 13, wherein the sub-operations comprise:
in response to at least one design rule violation being detected by the checking of the pin access points of the second least cost path, performing another iteration of the sub-operations.

15. The non-transitory computer-readable medium of claim 13, wherein the sub-operations comprise:
in response to at least one design rule violation being detected by the checking of the pin access points of the second least cost path, and after a predetermined number of iterations of the sub-operations:
adding the latest version of the candidate set of pin access points to the set of pin access locations; and
ending further iterations of the sub-operations.

16. A method comprising:
accessing, by a hardware processor, circuit data that describes a cell for a circuit design, the cell comprising a set of pins, the set of pins being a current set of pins to be processed; and
iteratively performing, by the hardware processor, operations comprising:
generating an ordered set of pins by ordering the current set of pins based on at least one sorting criterion;
generating a directed graph that comprises nodes corresponding to pin access points of the ordered set of pins, the generating the directed graph comprising traversing through the ordered set of pins in order and, for each traversed pin, connecting each pin access point of the traversed pin to all pin access points of a next pin to be traversed in the ordered set of pins;
determining a least cost path, in the directed graph, from a start node of the directed graph to an end pin node of the directed graph, the start node of the directed graph corresponding to one pin access point of a first pin in the ordered set of pins, the end node corresponding to one pin access point of a last pin in the ordered set of pins, nodes of the least cost path corresponding to a candidate set of pin access points for the cell;
checking the candidate set of pin access points for one or more design rule violations; and
based on the checking of the candidate set of pin access points for one or more design rule violations:
adding, to a set of pin access locations for the cell, any pin access points from the candidate set of pin access points that are not associated with any design rule violations; and
either:
performing another iteration of the operations using, as the current set of pins, any pins having at least one pin access point in the candidate set of pin access points that has at least one design rule violation; or
ending further iterations of the operations.

17. The method of claim 16, wherein the directed graph is a first directed graph, wherein the least cost path is a first least cost path, wherein the traversed pin is a first traversed pin, and wherein the generating of the set of pin access locations comprises:
in response to at least one design rule violation being detected by the checking of the candidate set of pin access points, iteratively performing sub-operations that comprise:
adding, to the set of pin access locations, any pin access points from a latest version of the candidate set of pin access points that are not associated with any design rule violations detected by a last check of one or more design rule violations:
determining a subset of pins from the set of pins that have at least one pin access point, in the latest version of the candidate set of pin access points, that is associated with at least one design rule violation detected by the last check of one or more design rule violations;
generating an ordered subset of pins by ordering the subset of pins based on the at least one sorting criterion;
generating a second directed graph that comprises nodes corresponding to pin access points of the ordered subset of pins, the generating the second directed graph comprising by traversing through the ordered subset of pins in order and, for each second traversed pin, connecting each pin access point of the second traversed pin to all pin access points of a next pin to be traversed in the ordered subset of pins;
determining a second least cost path, in the second directed graph, from a start node of the second directed graph to an end node of the second directed graph, the start node of the directed graph corresponding to one pin access point of a first pin in the ordered subset of pins, the end node of the directed graph corresponding to one pin access point of a last pin in the ordered subset of pins, nodes of the second least cost path corresponding to the latest version of the candidate set of pin access points for the cell;
checking the latest version of the candidate set of pin access for one or more design rule violations; and in response to no design rule violations being detected by the checking of the latest version of the candidate set of pin access points:
adding the latest version of the candidate set of pin access points to the set of pin access locations; and
ending further iterations of the sub-operations.

18. The method of claim 17, wherein the sub-operations comprise:
in response to at least one design rule violation being detected by the checking of the pin access points of the second least cost path, performing another iteration of the sub-operations.

19. The method of claim 17, wherein the sub-operations comprise:
in response to at least one design rule violation being detected by the checking of the pin access points of the second least cost path, and after a predetermined number of iterations of the sub-operations:
adding the latest version of the candidate set of pin access points to the set of pin access locations; and
ending further iterations of the sub-operations.

20. The method of claim 17, wherein the sub-operations comprise:
in response to at least one design rule violation being detected by the checking of the pin access points of the second least cost path, and after a predetermined number of iterations of the sub-operations with no decrease in design rule violation count between iterations and:
adding the latest version of the candidate set of pin access points to the set of pin access locations; and
ending further iterations of the sub-operations.

\* \* \* \* \*